United States Patent
Pezeshki et al.

(10) Patent No.: US 12,200,696 B2
(45) Date of Patent: *Jan. 14, 2025

(54) SIGNALING OF MULTIPLE CANDIDATE CELLS FOR L1/L2-CENTRIC INTER-CELL MOBILITY

(71) Applicant: QUALCOMM Incorporated, San Diego, CA (US)

(72) Inventors: Hamed Pezeshki, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,451

(22) Filed: Apr. 27, 2023

(65) Prior Publication Data

US 2023/0389013 A1 Nov. 30, 2023

Related U.S. Application Data

(63) Continuation of application No. 17/127,648, filed on Dec. 18, 2020, now Pat. No. 11,671,961.

(Continued)

(51) Int. Cl.
*H04W 24/10* (2009.01)
*H04W 36/36* (2009.01)
(Continued)

(52) U.S. Cl.
CPC ....... *H04W 72/1268* (2013.01); *H04W 24/10* (2013.01); *H04W 36/362* (2023.05); *H04W 56/0045* (2013.01); *H04W 72/54* (2023.01)

(58) Field of Classification Search
CPC ............. H04W 72/1268; H04W 24/10; H04W 56/0045; H04W 72/1226; H04W 36/36; H04W 36/0061

See application file for complete search history.

(56) References Cited

U.S. PATENT DOCUMENTS 9,313,672 B2    4/2016  Caretti et al.
2013/0301422 A1 11/2013 Caretti et al.
(Continued)

FOREIGN PATENT DOCUMENTS

CN    102882612 A    1/2013
WO    2017173037 A1  10/2017
(Continued)

OTHER PUBLICATIONS

3GPP TS 38.300: "3rd Generation Partnership Project, Technical Specification Group Radio Access Network, NR, NR and NG-RAN Overall Description, Stage 2 (Release 15)", V15.7.0 (Sep. 2019), 3GPP Draft, 38300-F70, 3rd Generation Partnership Project (3GPP), Mobile Competence Centre, 650, Route Des Lucioles, F-06921, Sophia-Antipolis Cedex, France, Sep. 26, 2019 (Sep. 26, 2019), 99 Pages, XP051799944, p. 49-p. 61.
(Continued)

*Primary Examiner* — Chuong A Ngo
(74) *Attorney, Agent, or Firm* — Loza & Loza, LLP

(57) ABSTRACT

A scheduled entity receives a communication from a scheduling entity that facilitates a configuration on how to connect with a plurality of candidate cells. The scheduled entity then exchanges information about the plurality of candidate cells with the scheduling entity via Layer 1 (L1)/Layer 2 (L2) signaling, and connects with at least one of the plurality of candidate cells based on the L1/L2 signaling and the configuration. In another example, a scheduling entity transmits a communication to a scheduled entity to pre-configure the scheduled entity on how to connect with a plurality of candidate cells. The scheduling entity then receives information about the plurality of candidate cells from the scheduled entity via L1/L2 signaling, and dynamically selects via the L1/L2 signaling at least one of the plurality of candidate cells to serve the scheduled entity.

20 Claims, 11 Drawing Sheets

Related U.S. Application Data

(60) Provisional application No. 62/952,191, filed on Dec. 20, 2019, provisional application No. 62/952,194, filed on Dec. 20, 2019.

(51) Int. Cl.
*H04W 56/00* (2009.01)
*H04W 72/1268* (2023.01)
*H04W 72/54* (2023.01)

(56) References Cited

U.S. PATENT DOCUMENTS

| | | |
|---|---|---|
| 2014/0177601 A1 | 6/2014 | Nishio et al. |
| 2017/0034753 A1 | 2/2017 | Yang et al. |
| 2017/0142630 A1 | 5/2017 | Yi et al. |
| 2018/0279182 A1 | 9/2018 | Sang et al. |
| 2019/0174384 A1 | 6/2019 | Kim et al. |
| 2019/0342802 A1 | 11/2019 | Du et al. |
| 2021/0212091 A1 | 7/2021 | Pezeshki et al. |
| 2022/0061113 A1* | 2/2022 | Kim .................. H04W 24/08 |

FOREIGN PATENT DOCUMENTS

| | | |
|---|---|---|
| WO | 2018228702 A1 | 12/2018 |
| WO | 2019195060 A1 | 10/2019 |

OTHER PUBLICATIONS

Ericsson: "Focus Areas for Release-17 feMIMO", 3GPP Draft, 3GPP TSG-RAN WG1 Meeting #99, R1-1912658, 3rd Generation Partnership Project (3GPP), Mobile Competence Centre, 650, Route Des Lucioles, F-06921 Sophia-Antipolis Cedex, France, vol. RAN WG1. No. Reno. USA, Nov. 18, 2019-Nov. 22, 2019, Nov. 8, 2019 (Nov. 8, 2019), XP051820152, pp. 1-10, Section 2.1, p. 1-p. 3, figure 1.

Ericsson: "TP for 38.331 on CHO", 3GPP Draft, 3GPP TSG-RAN WG2 #108, R2-1914638, 3rd Generation Partnership Project (3GPP), Mobile Competence Centre, 650, Route Des Lucioles, F-06921, Sophia-Antipolis Cedex, France, vol. RAN WG2, No. Reno, Nevada, USA; Nov. 18, 2019-Nov. 22, 2019, Nov. 7, 2019 (Nov. 7, 2019), XP051815697, 38 pages, p. 7-p. 8, p. 13-p. 14, p. 26-p. 30.

International Preliminary Report on Patentability—PCT/US2020/066272, The International Bureau of WIPO—Geneva, Switzerland, Jun. 30, 2022.

International Search Report and Written Opinion—PCT/US2020/066235—ISA/EPO—Oct. 27, 2021.

International Search Report and Written Opinion—PCT/US2020/066272—ISA/EPO—Apr. 16, 2021.

Qualcomm Incorporated: "On Mobility Enhancements," 3GPP Draft, 3GPP TSG-RAN WG1 Meeting #96bis, R1-1905038, On Mobility Enhancements, 3rd Generation Partnership Project (3GPP), Mobile Competence Centre, 650, Route Des Lucioles, F-06921, Sophia-Antipolis Cedex, France, vol. RAN WG1, No. Xi'an, China, Apr. 8, 2019-Apr. 12, 2019, Mar. 30, 2019 (Mar. 30, 2019), XP051691950, 9 pages, p. 5-p. 7.

Samsung: "Summary of Email Discussion for FR2 Specific Enhancements", 3GPP Draft, 3GPP TSG RAN Meeting #86, RP-192437, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019, 9 Pages, Dec. 2, 2019 (Dec. 2, 2019), XP051835466, Section 2.3, the whole document.

* cited by examiner

SIGNALING OF MULTIPLE CANDIDATE CELLS FOR L1/L2-CENTRIC INTER-CELL MOBILITY

PRIORITY CLAIM

This patent application is a continuation of U.S. non-provisional application Ser. No. 17/127,648 filed in the United States Patent Office on Dec. 18, 2020, which claims priority to and the benefit of provisional patent application No. 62/952,194 filed in the United States patent office on Dec. 20, 2019 and provisional patent application No. 62/952,191 filed in the United States patent office on Dec. 20, 2019, the entire content of which prior application is incorporated herein by reference as if fully set forth below in its entirety and for all applicable purposes.

TECHNICAL FIELD

The technology discussed below relates generally to wireless communication systems, and more particularly, to the signaling of multiple candidate cells for PHY layer/Layer 1 (L1) and MAC layer/Layer 2 (L2)-Centric Inter-Cell Mobility.

INTRODUCTION

The technology discussed below relates generally to wireless communication systems, and more particularly, to facilitating mobility within wireless networks. Some aspects relate to improving PHY/L1 and MAC/L2 centric inter-cell mobility, which ensures that a wireless user equipment (UE) is able to change or hand-off from one wireless cell to another wireless cell whenever the UE detects an adjacent wireless cell with better signal quality.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects directed towards Layer 1 (L1)/Layer 2 (L2)-Centric Inter-Cell Mobility are disclosed. In one example, aspects are directed towards a scheduled entity (e.g., a user equipment (UE)). For this example, the scheduled entity may receive a communication from a scheduling entity that facilitates a configuration of the scheduled entity on how to connect with a plurality of candidate cells. The scheduled entity may then exchange information about the plurality of candidate cells with the scheduling entity via L1/L2 signaling, and connect with at least one of the plurality of candidate cells based on the L1/L2 signaling and the configuration. In some aspects, the exchanged information can include L1 measurements, for example, a reference signal receive power (RSRP), a signal-to-interference-plus-noise ratio (SINR), or a reference signal received quality (RSRQ). In some aspects, the L1 measurements can include metrics without Layer 3 averaging.

In another example, aspects are directed towards a scheduling entity (e.g., a gNode B (gNB)). For instance, a scheduling entity may transmit a communication to a scheduled entity to pre-configure the scheduled entity on how to connect with a plurality of candidate cells. The scheduling entity may then receive information about the plurality of candidate cells from the scheduled entity via L1/L2 signaling, and dynamically select via the L1/L2 signaling at least one of the plurality of candidate cells to serve the scheduled entity. In some aspects, the received information can include L1 measurements, for example, a reference signal receive power (RSRP), a signal-to-interference-plus-noise ratio (SINR), or a reference signal received quality (RSRQ). In some aspects, the L1 measurements can include metrics without Layer 3 averaging.

In one aspect, a method of wireless communication operable at a scheduled entity is disclosed. The scheduled entity receives a communication from a scheduling entity, wherein the communication includes a configuration of a plurality of candidate cells. The scheduled entity reports measurements about the plurality of candidate cells to the scheduling entity via signaling including at least one of L1 signaling or L2 signaling. Then, the scheduled entity connects with at least one of the plurality of candidate cells based on the signaling, and the configuration of the plurality of candidate cells.

In one aspect, a scheduled entity for wireless communication includes a communication interface configured for wireless communication with a scheduling entity, a memory, and a processor operatively coupled with the communication interface and the memory. The processor and the memory can be configured to receive a communication from a scheduling entity, wherein the communication includes a configuration of a plurality of candidate cells. The processor and the memory can be configured to report measurements about the plurality of candidate cells to the scheduling entity via signaling including at least one of L1 signaling or L2 signaling. The processor and the memory can be configured to connect the scheduled entity with at least one of the plurality of candidate cells based on the signaling and the configuration of the plurality of candidate cells.

In one aspect, a method of wireless communication operable at a scheduling entity is disclosed. The scheduling entity transmits a communication to a scheduled entity, wherein the communication includes a configuration of a plurality of candidate cells. The scheduling entity receives measurements about the plurality of candidate cells from the scheduled entity via signaling including at least one of L1 signaling or L2 signaling. Then, the scheduling entity dynamically selects via the signaling at least one of the plurality of candidate cells to serve the scheduled entity based on the measurements and the configuration of the plurality of candidate cells.

In one aspect, a scheduling entity for wireless communication includes a communication interface configured for wireless communication with a scheduled entity, a memory, and a processor operatively coupled with the communication interface and the memory. The processor and the memory are configured to transmit a communication to the scheduled entity, wherein the communication includes a configuration of a plurality of candidate cells. The processor and the memory are configured to receive measurements about the plurality of candidate cells from the scheduled entity via signaling including at least one of L1 signaling or L2 signaling. The processor and the memory are configured to dynamically select via the signaling at least one of the plurality of candidate cells to serve the scheduled entity based on the measurements and the configuration of the plurality of candidate cells.

These and other aspects of the invention will become more fully understood upon a review of the detailed description, which follows. Other aspects, features, and examples will become apparent to those of ordinary skill in the art, upon reviewing the following description of specific, exemplary examples in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method, it should be understood that such examples can be implemented in various devices, systems, and methods.

DETAILED DESCRIPTION

Figure 1:
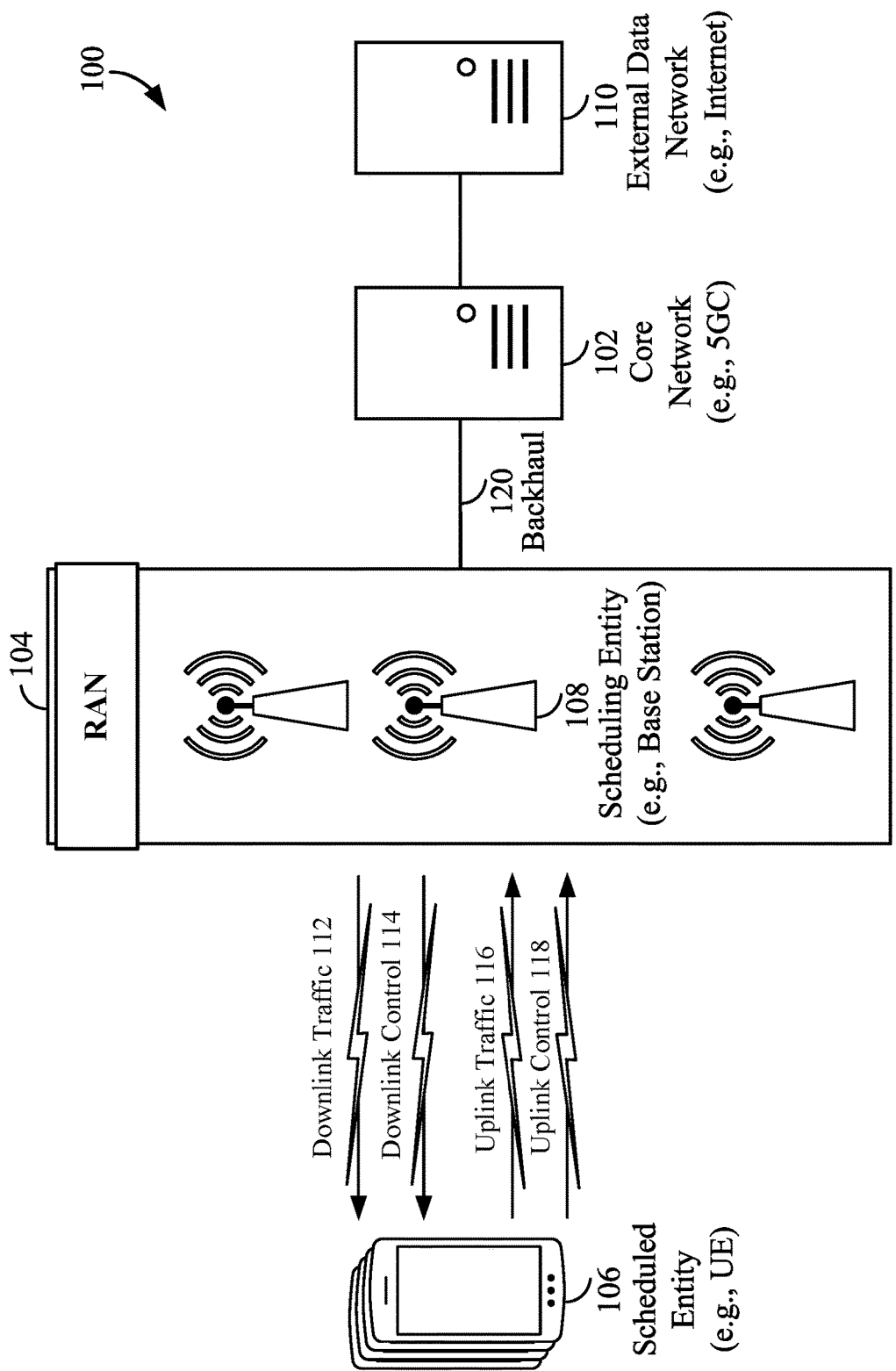
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Of note, for 5G New Radio (NR) systems inter-cell mobility may be configured to be layer 1 (i.e., the L1 or PHY layer) or layer 2 (i.e., the L2 or MAC layer) centric (i.e., L1/L2-centric). It is noted that within the 5G NR framework, various operation modes for such L1/L2-centric inter-cell mobility may be possible for different operational scenarios as will be further described herein. Additionally, the following definitions are provided for terminology that may be used within this disclosure.

Turning to the drawings, the various concepts presented throughout this disclosure may be implemented across a broad variety of telecommunication systems, network architectures, and communication standards. Referring to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; vehicles, aircraft, ships, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

For example, DL transmissions may include unicast or broadcast transmissions of control information and/or traffic information (e.g., user data traffic) from a base station (e.g., base station 210) to one or more UEs (e.g., UEs 222 and 224), while UL transmissions may include transmissions of control information and/or traffic information originating at a UE (e.g., UE 222). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
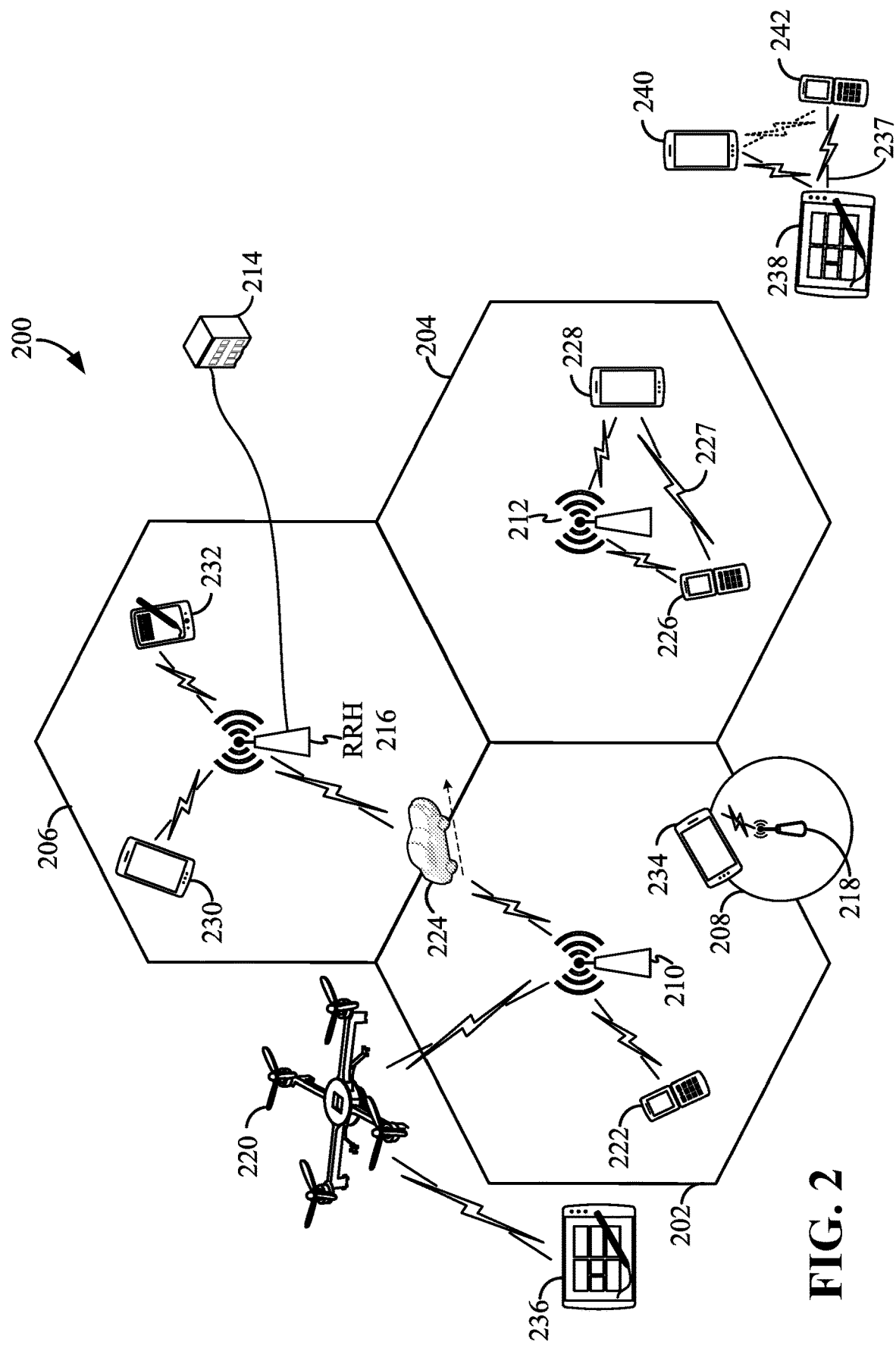
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification (e.g., a cell ID) broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints. In some aspects, each cell may have one or more physical cell IDs (PCIs) and have one or more physical cell sites (e.g., RRHs).

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer to peer (P2P) or sidelink signals 237 without relaying that communication through a base station (e.g., base station 212). In some examples, the UEs 238, 240, and 242 may each function as a scheduling entity or a transmitting sidelink device and/or a scheduled entity or a receiving sidelink device to schedule resources and communicate sidelink signals therebetween without relying on control information from a base station. In other examples, two or more UEs (e.g., UEs 126 and 128)

within the coverage area of a base station (e.g., base station 112) may also communicate sidelink signals 127 over a direct link (sidelink) without conveying that communication through the base station 112. In this example, the base station 112 may allocate resources to the UEs 226 and 228 for the sidelink communication. In either case, such sidelink signaling 227 and 237 may be implemented in a P2P network, device-to-device (D2D) network, vehicle-to-vehicle (V2V) network, vehicle to everything (V2X) network, a mesh network, or other suitable direct link network.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) and a security anchor function (SEAF) that performs authentication. The SCMF can manage, in whole or in part, the security context for both the control plane and the user plane functionality.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
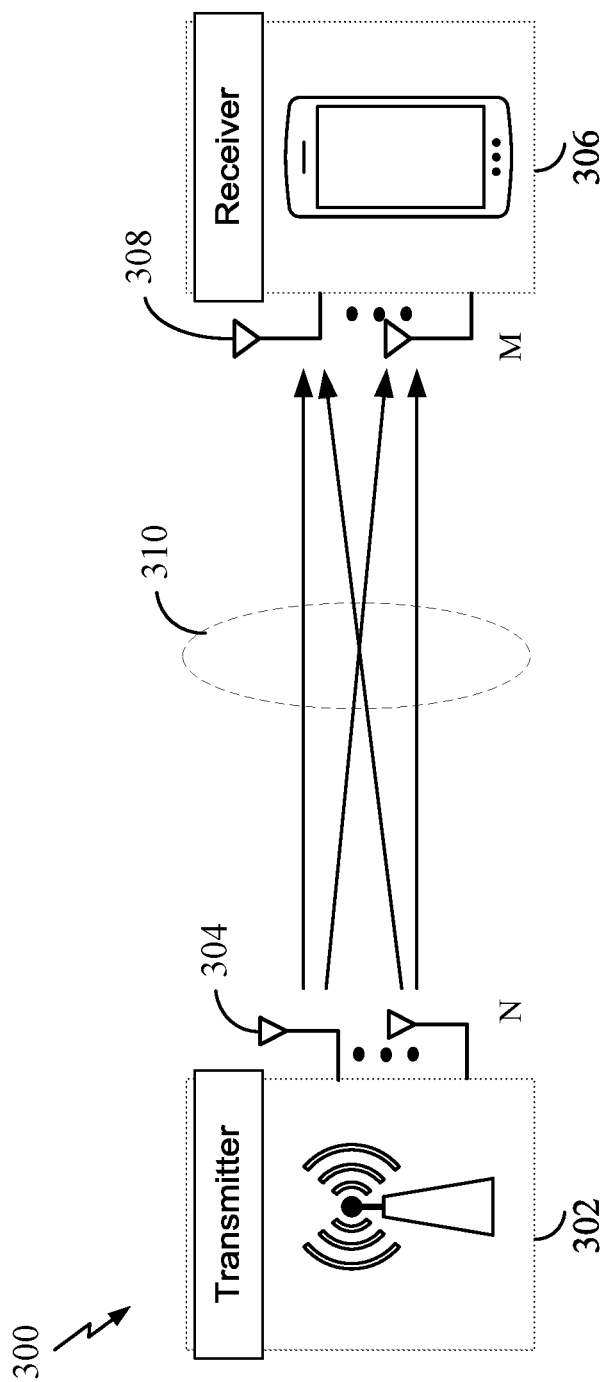
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In one example, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Beamforming is a signal processing technique that may be used at the transmitter 302 or receiver 306 to shape or steer an antenna beam (e.g., a transmit beam or receive beam) along a spatial path between the transmitter 302 and the receiver 306. Beamforming may be achieved by combining the signals communicated via antennas 304 or 308 (e.g., antenna elements of an antenna array module) such that some of the signals experience constructive interference while others experience destructive interference. To create the desired constructive/destructive interference, the transmitter 302 or receiver 306 may apply amplitude and/or phase offsets to signals transmitted or received from each of the antennas 304 or 308 associated with the transmitter 302 or receiver 306.

In 5G New Radio (NR) systems, particularly for FR2 (millimeter wave) systems, beamformed signals may be utilized for most downlink channels, including the physical downlink control channel (PDCCH) and physical downlink shared channel (PDSCH). In addition, broadcast control information, such as the synchronization signal block (SSB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub 6 GHz systems. In addition, beamformed signals may further be utilized in D2D systems, such as NR sidelink (SL) or V2X, utilizing FR2.

Figure 4:
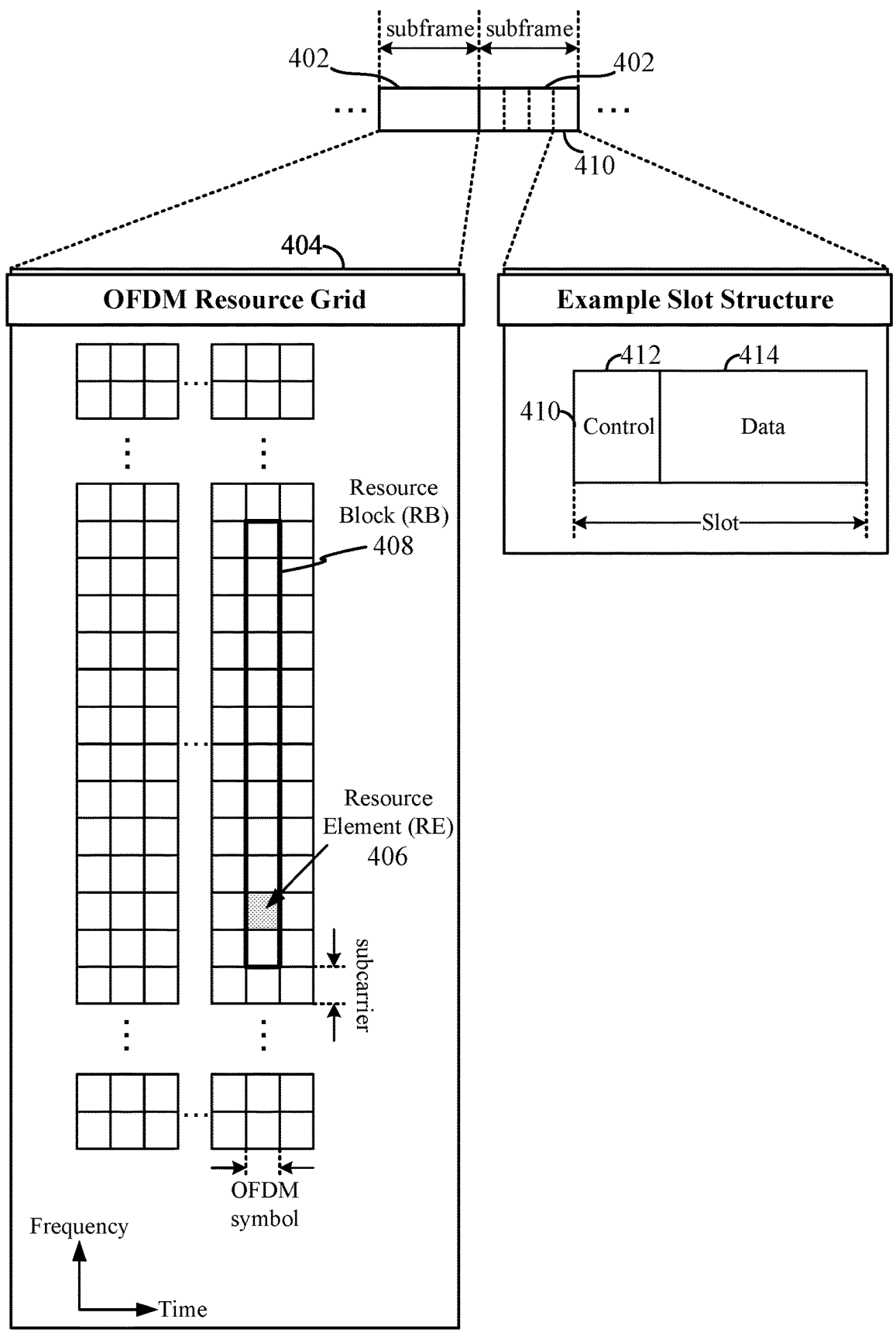
FIG. 4 is a schematic illustration of an organization of wireless resources in an air interface utilizing orthogonal frequency divisional multiplexing (OFDM) according to some aspects.

Various aspects of the present disclosure utilize an OFDM waveform, an example of which is schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame refers to a duration of 10 ms for wireless transmissions, with each frame consisting of 10 subframes of 1 ms each. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices and a groupcast communication is delivered to a group of intended recipient devices. A unicast communication may refer to a point-to-point transmission by one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB and/or a sidelink CSI-RS, may be transmitted within the slot 410.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In some examples, spatial division multiplexing may be implemented using a coordinated multi-point (CoMP) network configuration in which transmissions (streams) from multiple transmission and reception points (TRPs) may be simultaneously directed towards a single UE. In a multi-TRP environment providing multi-stream transmission, the multiple TRPs may or may not be collocated (e.g., at the same geographical location and coupled to the same antenna tower or pole). Each of the multiple TRPs may transmit the same or different data to a UE. When transmitting different data from the multiple TRPs, a higher throughput may be achieved. When transmitting the same data (with potentially different redundancy versions) from the multiple TRPs, transmission reliability may be improved. In some examples, each TRP may utilize the same carrier frequency to communicate with a UE. In other examples, each TRP may utilize a different carrier frequency that may be in the same or different frequency bands (e.g., FR2, FR4-a or FR4-1, FR4, FR5, etc.). For example, each TRP may communicate on different carrier frequencies (referred to as component carriers) in the same frequency band or across frequency bands and carrier aggregation may be performed at the UE.

Figure 5:
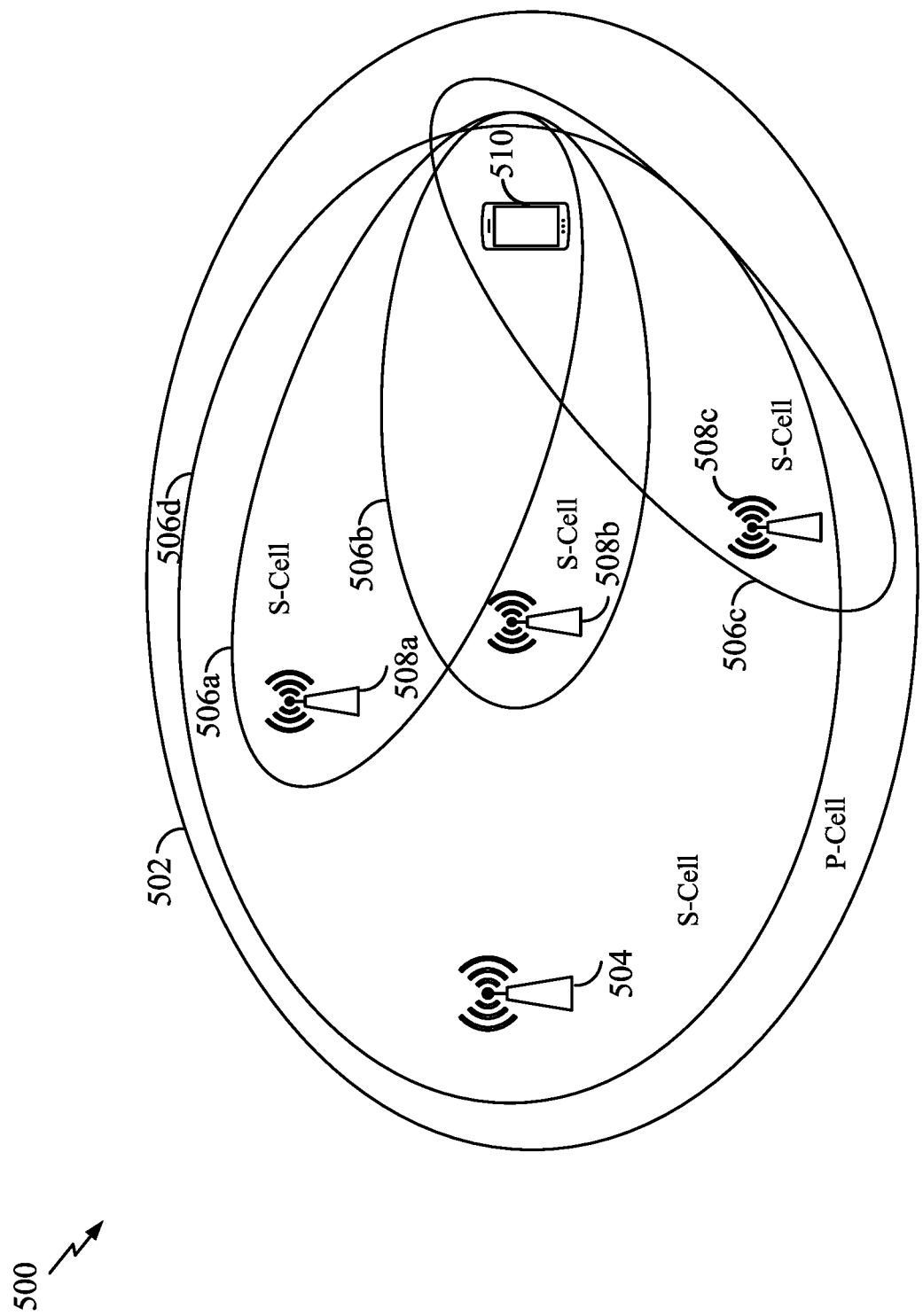
FIG. 5 illustrates a radio protocol architecture for a UE and/or gNB in which the disclosed aspects are operable.

FIG. 5 is a conceptual diagram illustrating an example of a multi-TRP environment 500 according to some aspects. The multi-TRP environment 500 includes a plurality of cells 502 and 506a-506d. In some examples, one of the cells 502 may be considered a primary serving cell (PCell) 502 and the remaining cells 506a, 506b, 506c, and 506d may be considered secondary serving cells (SCells). The PCell 502 may be referred to as the anchor cell that provides a radio resource control (RRC) connection to the UE. In some examples, the PCell and the SCell may be collocated (e.g., different TRPs at the same geographical location and coupled to the same antenna tower/pole).

When carrier aggregation (CA) is configured, one or more of the SCells 506a-506d may be activated or added to the PCell 502 to form the serving cells serving a user equipment (UE) 510. Each serving cell corresponds to a component carrier (CC). The CC of the PCell 502 may be referred to as a primary CC, and the CC of an SCell 506a-506d may be referred to as a secondary CC. The PCell 502 and one or more of the SCells 506 may be served by a respective TRP 504 and 508a-508c similar to any of those illustrated in FIGS. 1 and 2. In the example shown in FIG. 5, SCells 506a-506c are each served by a respective non-collocated TRP 508a-508c. However, SCell 506d is collocated with the PCell 502. Thus, TRP 504 may include two collocated TRPs, each supporting a different carrier. For example, TRP 504 may correspond to a base station including multiple collocated TRPs. The coverage of the PCell 502 and SCell 506d may differ since different component carriers (which may be in different frequency bands) may experience different path loss.

In some examples, the PCell 502 may add or remove one or more of the SCells 506a-506d to improve reliability of the connection to the UE 510 and/or increase the data rate. The PCell 502 may be changed upon a handover to another PCell.

In some examples, one of the cells (e.g., cell 502) may be a low band cell, and another cell (e.g., cell 506*d*) may be a high band cell. A low band cell uses a carrier frequency in a frequency band lower than that of the high band cells. For example, the high band cell may use a high band mmWave carrier (e.g., FR4-a or FR4-1 or above), and the low band cell may use a low band mmWave carrier (e.g., FR2). In this example, carrier aggregation may not be performed between the cells 502 and 506*d*, depending on whether carrier aggregation across frequency bands is supported. In addition, when using mmWave carriers (FR2 or above), beamforming may be used to transmit and receive signals.

Figure 6:
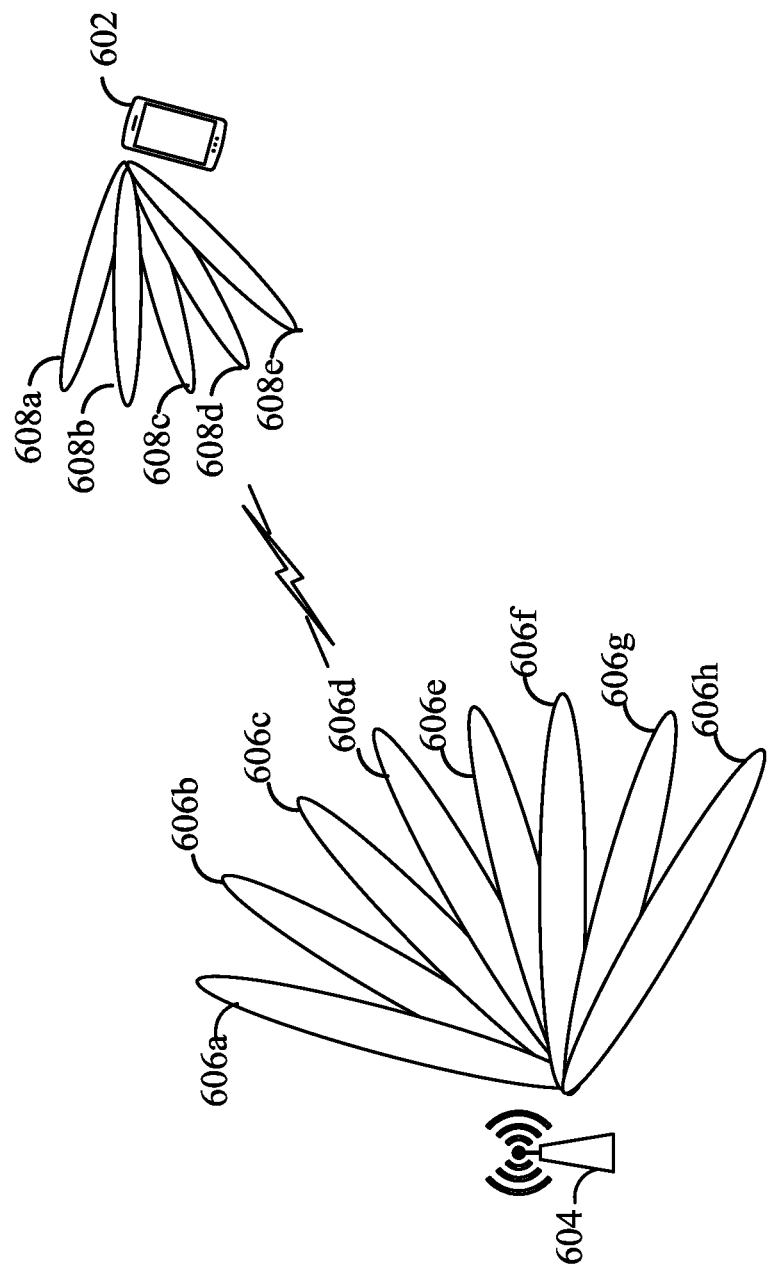
FIG. 6 is a diagram illustrating communication between a base station and a UE using beamformed signals according to some aspects.

FIG. 6 is a diagram illustrating communication between a base station 604 and a UE 602 using beamformed signals according to some aspects. The base station 604 may be any of the base stations (e.g., gNBs) or scheduling entities illustrated in FIGS. 1 and/or 2, and the UE 602 may be any of the UEs or scheduled entities illustrated in FIGS. 1 and/or 2.

The base station 604 may generally be capable of communicating with the UE 602 using one or more transmit beams, and the UE 602 may further be capable of communicating with the base station 604 using one or more receive beams. As used herein, the term transmit beam refers to a beam on the base station 604 that may be utilized for downlink or uplink communication with the UE 602. In addition, the term receive beam refers to a beam on the UE 602 that may be utilized for downlink or uplink communication with the base station 604.

In the example shown in FIG. 6, the base station 604 is configured to generate a plurality of transmit beams 606*a*-606*h*, each associated with a different spatial direction. In addition, the UE 602 is configured to generate a plurality of receive beams 608*a*-608*e*, each associated with a different spatial direction. It should be noted that while some beams are illustrated as adjacent to one another, such an arrangement may be different in different aspects. For example, transmit beams 606*a*-606*h* transmitted during a same symbol may not be adjacent to one another. In some examples, the base station 604 and UE 602 may each transmit more or less beams distributed in all directions (e.g., 360 degrees) and in three-dimensions. In addition, the transmit beams 606*a*-606*h* may include beams of varying beam width. For example, the base station 604 may transmit certain signals (e.g., SSBs) on wider beams and other signals (e.g., CSI-RSs) on narrower beams.

The base station 604 and UE 602 may select one or more transmit beams 606*a*-606*h* on the base station 604 and one or more receive beams 608*a*-608*e* on the UE 602 for communication of uplink and downlink signals therebetween using a beam management procedure. In one example, during initial cell acquisition, the UE 602 may perform a P1 beam management procedure to scan the plurality of transmit beams 606*a*-606*h* on the plurality of receive beams 608*a*-608*e* to select a beam pair link (e.g., one of the transmit beams 606*a*-606*h* and one of the receive beams 608*a*-608*e*) for a physical random access channel (PRACH) procedure for initial access to the cell. For example, periodic SSB beam sweeping may be implemented on the base station 604 at certain intervals (e.g., based on the SSB periodicity). Thus, the base station 604 may be configured to sweep or transmit an SSB on each of a plurality of wider transmit beams 606*a*-606*h* during the beam sweeping interval. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured, and the selected transmit beam may have the highest RSRP as measured on the selected receive beam.

After completing the PRACH procedure, the base station 604 and UE 602 may perform a P2 beam management procedure for beam refinement at the base station 604. For example, the base station 604 may be configured to sweep or transmit a CSI-RS on each of a plurality of narrower transmit beams 606*a*-606*h*. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 602 is configured to scan the plurality of CSI-RS transmit beams 606*a*-606*h* on the plurality of receive beams 608*a*-608*e*. The UE 602 then performs beam measurements (e.g., RSRP, SINR, etc.) of the received CSI-RSs on each of the receive beams 608*a*-608*e* to determine the respective beam quality of each of the CSI-RS transmit beams 606*a*-606*h* as measured on each of the receive beams 608*a*-608*e*.

The UE 602 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams 606*a*-606*h* on one or more of the receive beams 608*a*-608*e* to the base station 604. The base station 604 may then select one or more CSI-RS transmit beams on which to communicate downlink and/or uplink control and/or data with the UE 602. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 602 may further select a corresponding receive beam on the UE 602 for each selected serving CSI-RS transmit beam to form a respective beam pair link (BPL) for each selected serving CSI-RS transmit beam. For example, the UE 602 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the base station 604 may configure the UE 602 to perform SSB beam measurements and provide an L1 measurement report containing beam measurements of SSB transmit beams 606*a*-606*h*. For example, the base station 604 may configure the UE 602 to perform SSB beam measurements and/or CSI-RS beam measurements for beam failure detection (BRD), beam failure recovery (BFR), cell reselection, beam tracking (e.g., for a mobile UE 602 and/or base station 604), or other beam optimization purpose.

In addition, when the channel is reciprocal, the transmit and receive beams may be selected using an uplink beam management scheme. In an example, the UE 602 may be configured to sweep or transmit on each of a plurality of receive beams 608a-608e. For example, the UE 602 may transmit an SRS on each beam in different beam directions. In addition, the base station 604 may be configured to receive the uplink beam reference signals on a plurality of transmit beams 606a-606h. The base station 604 then performs beam measurements (e.g., RSRP, SINR, etc.) of the beam reference signals on each of the transmit beams 606a-606h to determine the respective beam quality of each of the receive beams 608a-608e as measured on each of the transmit beams 606a-606h.

The base station 604 may then select one or more transmit beams on which to communicate downlink and/or uplink control and/or data with the UE 602. In some examples, the selected transmit beam(s) have the highest RSRP. The UE 602 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., beam 606d) on the base station 604 and a single receive beam (e.g., beam 608c) on the UE may form a single BPL used for communication between the base station 604 and the UE 602. In another example, multiple CSI-RS transmit beams (e.g., beams 606c, 606d, and 606e) on the base station 604 and a single receive beam (e.g., beam 608c) on the UE 602 may form respective BPLs used for communication between the base station 604 and the UE 602. In another example, multiple CSI-RS transmit beams (e.g., beams 606c, 606d, and 606e) on the base station 604 and multiple receive beams (e.g., beams 608c and 608d) on the UE 602 may form multiple BPLs used for communication between the base station 604 and the UE 602. In this example, a first BPL may include transmit beam 606c and receive beam 608c, a second BPL may include transmit beam 608d and receive beam 608c, and a third BPL may include transmit beam 608e and receive beam 608d.

Concerning multi-beam operation of the apparatus in FIG. 6, for example, enhancements in 5G NR for multi-beam operation have targeted FR2 frequency bands, but are also applicable to the FR1 frequency bands. These enhancements have been provided to facilitate more efficient (i.e., lower latency and overhead) DL/UL beam management to support higher intra-cell and L1/L2-centric inter-cell mobility and a larger number of configured transmission configuration indicator (TCI) states. These enhancements may be effected by providing a common beam for data and control transmission/reception for DL and UL, especially for intra-band carrier aggregation (CA). Also, enhancements may be engendered with a unified TCI framework for DL and UL beam indication. Further, enhancements concerning signaling mechanisms for these features can improve latency and efficiency through greater usage of dynamic control signaling as opposed to RRC signaling. Also, enhancements for multi-beam operation may be based on identifying and specifying features to facilitate UL beam selection for UEs equipped with multiple panels, taking into consideration UL coverage loss mitigation due to maximum permissible exposure (MPE) limitations, and based on UL beam indication with the unified TCI framework for UL fast panel selection.

Other enhancements may be for supporting multi-TRP deployment, including targeting both FR1 and FR2 frequency bands. In particular, enhancement may focus on identifying and specifying features to improve reliability and robustness for channels other than PDSCH (i.e., PDCCH, PUSCH, and PUCCH) using multi-TRP or multi-panel with 3GPP Release 16 reliability features as the baseline. Additionally, enhancements may concern identifying and specifying QCL/TCI-related enhancements to enable inter-cell multi-TRP operations, assuming multi-DCI based multi-PDSCH reception. Further, beam-management-related enhancements for simultaneous multi-TRP transmission with multi-panel reception may be provided. Still further concerning multi-TRP deployments, enhancements to support high speed train-single frequency network (HST-SFN) deployment scenarios may be provided, such as identifying and specifying solution(s) on QCL assumptions for DMRS (e.g., multiple QCL assumptions for the same DMRS port(s), targeting DL-only transmissions, or specifying QCL/QCL-like relations (including applicable type(s) and the associated requirement) between DL and UL signals by reusing the unified TCI framework.

It is further noted that according to certain aspects, the methodology disclosed herein may be implemented at the layer 1 (L1) and layer 2 (L2) levels of a radio access network. The radio protocol architecture for a radio access network, such as the radio access network 104 shown in FIG. 1 and/or the radio access network 200 shown in FIG. 2, may take on various forms depending on the particular application. An example of a radio protocol architecture for the user and control planes is illustrated in FIG. 7.

Figure 7:
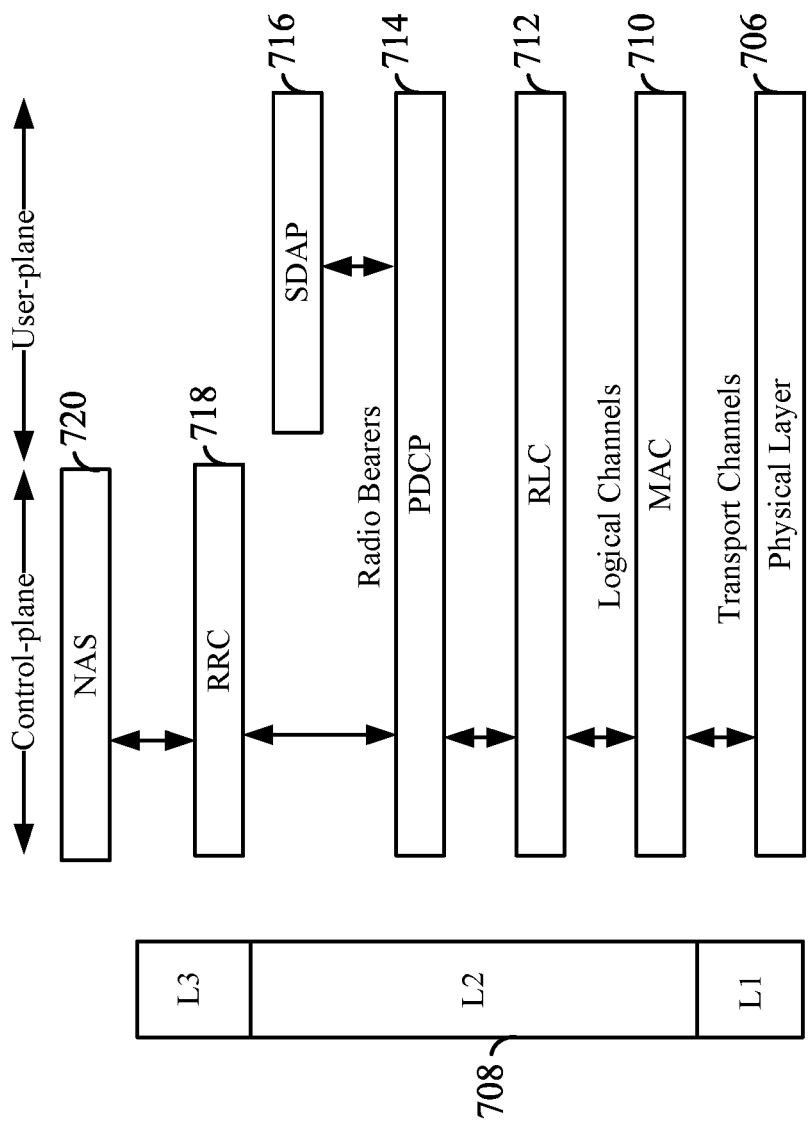
FIG. 7 is a diagram illustrating an exemplary radio protocol architecture according to some aspects.

As illustrated in FIG. 7, the radio protocol architecture for the UE and the base station includes three layers: layer 1 (L1), layer 2 (L2), and layer 3 (L3). L1 is the lowest layer and implements various physical layer signal processing functions, including the remote radio head (RRH) in the case of gNBs. L1 will be referred to herein as the physical layer 706. L2 708 is above the physical layer 706 and is responsible for the link between the UE and base station over the physical layer 706.

In the user plane, the L2 layer 708 includes a media access control (MAC) layer 710, a radio link control (RLC) layer 712, a packet data convergence protocol (PDCP) 714 layer, and a service data adaptation protocol (SDAP) layer 716, which are terminated at the base station on the network side. Although not shown, the UE may have several upper layers above the L2 layer 708 including at least one network layer (e.g., IP layer and user data protocol (UDP) layer) that is terminated at the User Plane Function (UPF) on the network side and one or more application layers.

The SDAP layer 716 provides a mapping between a 5G core (5GC) quality of service (QoS) flow and a data radio bearer and performs QoS flow ID marking in both downlink and uplink packets. The PDCP layer 714 provides packet sequence numbering, in-order delivery of packets, retransmission of PDCP protocol data units (PDUs), and transfer of upper layer data packets to lower layers. PDU's may include, for example, Internet Protocol (IP) packets, Ethernet frames and other unstructured data (i.e., Machine-Type Communication (MTC), hereinafter collectively referred to as "packets"). The PDCP layer 714 also provides header compression for upper layer data packets to reduce radio transmission overhead, security by ciphering the data packets, and integrity protection of data packets. A PDCP context may indicate whether PDCP duplication is utilized for a unicast connection.

The RLC layer 712 provides segmentation and reassembly of upper layer data packets, error correction through automatic repeat request (ARQ), and sequence numbering independent of the PDCP sequence numbering. An RLC context may indicate whether an acknowledged mode (e.g., a reordering timer is used) or an unacknowledged mode is used for the RLC layer 712. The MAC layer 710 provides multiplexing between logical and transport channels. The MAC layer 710 is also responsible for allocating the various radio resources (e.g., resource blocks) in one cell among the UEs and for HARQ operations. A MAC context may enable, for example, a HARQ feedback scheme, resource selection algorithms, carrier aggregation, beam failure recovery, or other MAC parameters for a unicast connection. The physical layer 706 is responsible for transmitting and receiving data on physical channels (e.g., within slots). A PHY context may indicate a transmission format and a radio resource configuration (e.g., bandwidth part (BWP), numerology, etc.) for a unicast connection.

In the control plane, the radio protocol architecture for the UE and base station is substantially the same for L1 706 and L2 708 with the exception that there is no SDAP layer in the control plane and there is no header compression function for the control plane. The control plane also includes a radio resource control (RRC) layer 718 in L3 and a higher Non Access Stratum (NAS) layer 720. The RRC layer 718 is responsible for establishing and configuring signaling radio bearers (SRBs) and data radio bearers (DRBs) between the base station the UE, paging initiated by the 5GC or NG-RAN, and broadcast of system information related to Access Stratum (AS) and Non Access Stratum (NAS). The RRC layer 718 is further responsible for QoS management, mobility management (e.g., handover, cell selection, inter-RAT mobility), UE measurement and reporting, and security functions. The NAS layer 720 is terminated at the AMF in the core network and performs various functions, such as authentication, registration management, and connection management.

As mentioned above, certain enhancements in 5G NR for multi-beam or multi-TRP operations may include L1/L2-centric inter-cell mobility, which may be a MIMO enhancement feature. Thus, the control for effecting UE mobility between cells (e.g., handoffs) is accomplished through controls and/or signaling in the L1 and/or L2 layers rather than at higher layers above the L2 layer; hence being L1/L2 "centric." According to aspects herein, operational modes or characteristics of this L1/L2-centric inter-cell mobility are disclosed. Broadly, aspects of the present disclosure provide methods and apparatus for operation of inter-cell mobility where at least one serving cell in a communication system is configured with one or more physical layer cell IDs (PCIs) according to a particular selected mode of operation through the use of either signaling or settings for the physical (PHY) layer or the media access control (MAC) layer. Further, based on the mode of operation, a radio resource head (RRH) can serve at least one user equipment (UE) based on power information received from at least one UE (e.g., reference signal receive power (RSRP) information).

In one particular operational aspect, each serving cell (e.g., cells 202, 204, 206) may be configured to have one physical layer cell identifier (PCI), but can have multiple physical cell sites, such as having multiple remote radio heads (RRHs) or remote radio units (RRUs). Each RRH may transmit a different set of SSB (synchronization signal/PBCH block) IDs or indexes but with the same, single PCI for the serving cell. According to a couple of examples, the selection may be accomplished through Layer 1 (L1) signaling using downlink control indicators (DCIs) in the L1 PHY layer or media access control-control element (MAC-CE) in the L2 MAC layer, wherein a MAC-CE is generally defined as a MAC structure used for carrying MAC layer control information between a gNB and a UE, and wherein the structure of a MAC-CE may be implemented as a special bit string in a logical channel ID (LCID) field of a MAC Header. In particular, DCI/MAC-CE is used to effect selection of which RRH(s) or corresponding SSBs will serve a UE based on the L1 based metrics (e.g., RSRP) per each reported SSB ID.

In another aspect, rather than only one PCI, each serving cell can be configured with multiple PCIs. Here, each RRH of the serving cell can use one PCI configured for the corresponding serving cell and may transmit a full set of SSB IDs. Selection of which RRH(s) or corresponding PCI(s) and/or SSB(s) serve the UE may be accomplished by DCI/MAC-CE and also based on the L1 based metrics (e.g., an RSRP) per reported SSB ID per reported PCI.

In still another aspect, each serving cell may have one PCI, but the DCI/MAC-CE can select which serving cell(s) or corresponding serving cell ID(s) will serve the UE based on the L1 based metrics (e.g., L1-RSRP) per reported SSB ID per reported PCI.

It should be appreciated that the different operational options noted above are not necessarily limited to SSB IDs, but rather may be applied generally to any cell-defining reference signals (RS), such as CSI-RS or positioning reference signals (PRS), as examples.

It should be further appreciated that, in some L1/L2-centric inter-cell mobility scenarios, it may be desirable for a gNB/UE to decide in advance one or more multiple candidate cells. Determining candidate cells in advance may be generally referred to as configuration or pre-configuration (or in some instances as advanced configuration or configuration). As one example, in accordance with some aspects, some scenarios can include using communication configurations that are configured (pre-configured) at a UE before communication. Pre-configurations may be static, dynamic, and/or changed during communications in some deployments. Among those candidate cells, it is contemplated that L1/L2 signaling may dynamically select which cells to serve the UE. For instance, in some implementations, it is contemplated that a gNB can signal a UE to preconfigure multiple candidate cells for L1/L2-based inter-cell mobility (e.g., via RRC/MAC-CE/DCI). Candidate cells can be identified by a serving cell ID or PCI, for example, and can be selected based on an L3-based measurement report per neighbor cell (or PCI).

In another aspect of the disclosure, it is contemplated that, for each candidate cell, a gNB may configure a UE with any of various cell configurations including, for example: PCI(s), SSB configuration/subcarrier carrier spacing (SCS), RMSI/random access configuration, rate matching patterns, DL/UL TDD configuration, supplementary uplink (SUL) configuration, DL/UL cell frequency locations, DL/UL bandwidth part (BWP) configuration, PDC CH/PDSCH/PUSCH/PUCCH/SRS configuration, CSI measurement/report configuration, TAG ID (in timing advance command MAC CE), and cross-carrier scheduling configuration. It is also contemplated that, for each candidate cell, a gNB may indicate whether a candidate cell is selected/deselected to serve a UE via L1/L2 signaling (e.g., DCI/MAC-CE). Once a candidate cell is selected, the UE may use the pre-configured cell configuration for communication.

In yet another aspect of the disclosure, it is contemplated that, for each candidate cell, a UE may be configured to perform measurements and report L1-based metrics or measurements (e.g., L1-RSRP/signal-to-interference-and-noise ratio (SINR)/(reference signal received quality) RSRQ). Based on the reported L1 metrics, a gNB may then be configured to determine whether to select/deselect the candidate cell to serve a UE. It is also contemplated that, for each candidate cell, a UE may report L3-based metrics or measurements as well (e.g., L3-RSRP/SINR/RSRQ) from which a gNB may then decide whether a candidate cell should be added to or removed from the candidate cell list. For each candidate cell, it is further contemplated that a UE may be configured to measure and update an uplink (UL) timing advance (TA). Here, it should be appreciated that such TA measurement and update can be scheduled by a gNB (e.g., via a PDCCH order based RACH for TA measurement), or can be autonomously performed by the UE (e.g., via a propagation delay measurement based on a DL signal (e.g., SSB), and reported in a MAC-CE piggybacked on a PUSCH). L1 measurements may in some scenarios have richer configurations relative to L3 measurements, and thus L1 measurements/metrics can enable and provide accurate, up-to-date, and/or fast reports for speedy cell switching scenarios.

Aspects directed towards non-candidate cells are also contemplated. For instance, for each non-candidate cell, a UE may be configured to at least perform L3-based measurements and reports from which a gNB may determine whether the non-candidate cell should be added to the candidate list.

Figure 8:
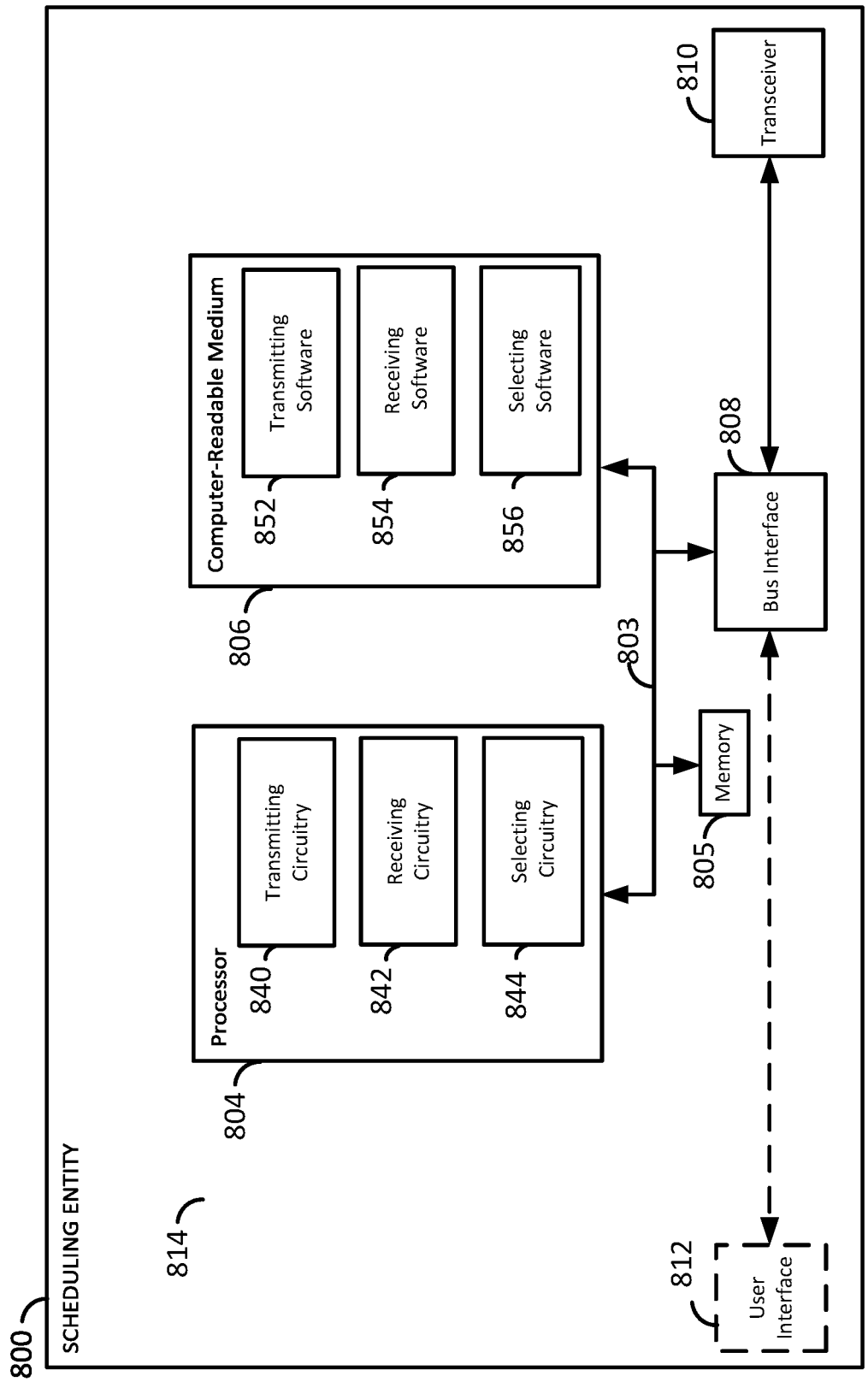
FIG. 8 is a block diagram illustrating an example of a hardware implementation for a scheduling entity employing a processing system in accordance with aspects disclosed herein.

FIG. 8 is a block diagram illustrating an example of a hardware implementation for a scheduling entity 800 employing a processing system 814. For example, the scheduling entity 800 may be a UE as illustrated in any one or more of the FIGS. 1, 2, 5, and/or 6 disclosed herein. In another example, the scheduling entity 800 may be a base station (e.g., a gNB) as also illustrated in any one or more of the FIGS. 1, 2, 5, and/or 6 disclosed herein.

The scheduling entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the processor 804, as utilized in a scheduling entity 800, may be used to implement any one or more of the processes and procedures described below and illustrated in FIG. 9.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided.

In some aspects of the disclosure, the processor 804 may include a transmitting circuitry 840 configured for various functions, including, for example, to transmit a communication to a scheduled entity, wherein the communication facilitates a configuration of the scheduled entity on how to connect with each of a plurality of candidate cells. As illustrated, the processor 804 may also include a receiving circuitry 842 configured for various functions. For instance, the receiving circuitry 842 may be configured to receive information about the plurality of candidate cells from the scheduled entity via L1/L2 signaling, wherein the L1/L2 signaling includes at least one of a first portion comprising physical layer signaling or a second portion comprising MAC layer signaling. The processor 804 may further include selecting circuitry 844 configured for various functions, including, for example, to dynamically select via the L1/L2 signaling at least one of the plurality of candidate cells to serve the scheduled entity. It should also be appreciated that, the combination of the transmitting circuitry 840, the receiving circuitry 842, and the selecting circuitry 844 may be configured to implement one or more of the functions described herein.

Various other aspects of scheduling entity 800 are also contemplated. In some implementations, for instance, it is contemplated that receiving circuitry 842 may be configured to receive reporting measurements associated with the plurality of candidate cells from the scheduled entity (e.g., a reference signal receive power (RSRP), a signal-to-interference-plus-noise ratio (SINR), or a reference signal received quality (RSRQ)). In a particular implementation, the measurements comprise metrics measured at a given time (e.g., L1-based metrics), wherein scheduling entity 800 may be configured to transmit instructions to the scheduled entity in response to receiving the reporting of the measurements, and wherein the instructions include instructions for selecting or deselecting a candidate cell to serve the scheduled entity. In another implementation, the measurements comprise metrics averaged over a period of time (e.g., L3-based metrics), wherein scheduling entity 800 may be configured to transmit instructions to the scheduled entity in response to receiving the reporting of the measurements, and wherein the instructions include instructions for removing a candidate cell from a list of candidate cells.

In another aspect of the disclosure, it is contemplated that scheduling entity 800 may be configured to instruct the scheduled entity via the L1/L2 signaling to measure and update an uplink (UL) timing advance (TA) of a candidate cell. Within such example, it is contemplated that scheduling entity 800 may be configured to transmit a scheduling to the scheduled entity for performing the measure and update. Alternatively, scheduling entity 800 may be configured to instruct the scheduled entity to perform the measure and update autonomously.

In yet another aspect of the disclosure, it is contemplated that scheduling entity 800 may be configured to receive reporting measurements associated with at least one non-candidate cell from the scheduled entity. Within such example, it is contemplated that scheduling entity 800 may be further configured to determine whether to instruct the scheduled entity to add the at least one non-candidate cell to a list of candidate cells based on the reporting measurements.

Referring back to the remaining components of scheduling entity 800, it should be appreciated that the processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include transmitting software 852 configured for various functions, including, for example, to transmit a communication to a scheduled entity, wherein the communication facilitates a configuration of the scheduled entity on how to connect with each of a plurality of candidate cells. As illustrated, the computer-readable storage medium 806 may also include receiving software 854 configured for various functions. For instance, the receiving software 854 may be configured to receive information about the plurality of candidate cells from the scheduled entity via L1/L2 signaling, wherein the L1/L2 signaling includes at least one of a first portion comprising physical layer signaling or a second portion comprising MAC layer signaling. The computer-readable storage medium 806 may further include selecting software 856 configured for various functions, including, for example, to dynamically select via the L1/L2 signaling at least one of the plurality of candidate cells to serve the scheduled entity.

In a particular configuration, it is also contemplated that the scheduling entity 800 includes means for transmitting a communication to a scheduled entity, wherein the communication facilitates a configuration of the scheduled entity on how to connect with each of a plurality of candidate cells; means for receiving information about the plurality of candidate cells from the scheduled entity via L1/L2 signaling, wherein the L1/L2 signaling includes at least one of a first portion comprising physical layer signaling or a second portion comprising MAC layer signaling; and means for dynamically selecting via the L1/L2 signaling at least one of the plurality of candidate cells to serve the scheduled entity. In one aspect, the aforementioned means may be the processor(s) 804 configured to perform the functions recited by the aforementioned means. In another aspect, the aforementioned means may be a circuit or any apparatus configured to perform the functions recited by the aforementioned means.

Figure 9:
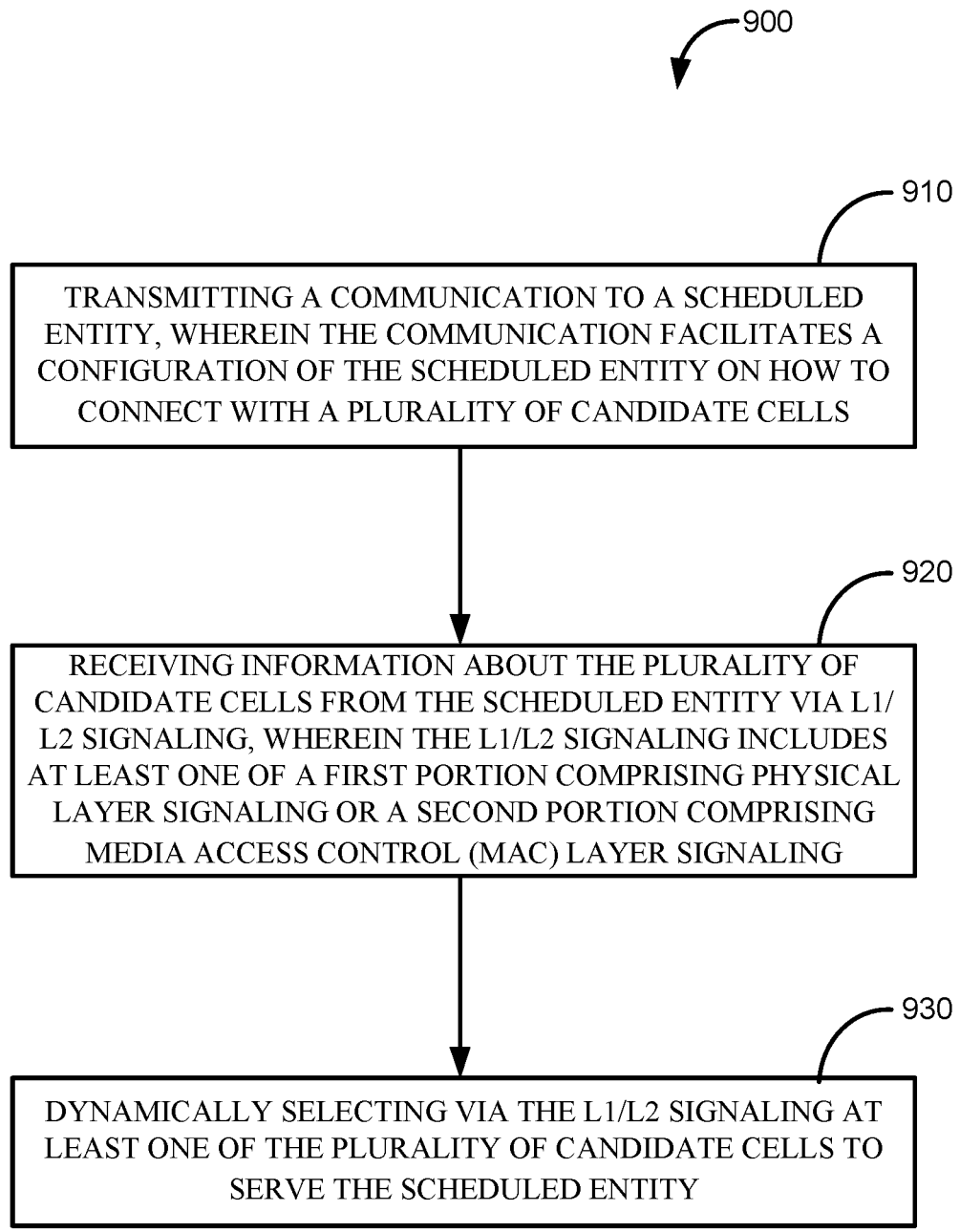
FIG. 9 is a flow chart illustrating an exemplary scheduling entity process that facilitates some aspects of the disclosure.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described herein and utilizing, for example, the processes and/or algorithms described in relation to FIG. 9.

In FIG. 9, a flow chart is provided, which illustrates an exemplary scheduling entity process that facilitates some aspects of the disclosure. As described below, some or all illustrated features may be omitted in a particular implementation within the scope of the present disclosure, and some illustrated features may not be required for all implementations. In some examples, the process 900 may be carried out by the scheduling entity 800 illustrated in FIG. 8. In some examples, the process 900 may be carried out by any suitable apparatus or means for carrying out the functions or algorithm described below.

Process 900 begins at block 910 with the scheduling entity 800 (e.g., a gNB) transmitting a communication to a scheduled entity (e.g., a UE), wherein the communication facilitates a configuration of the scheduled entity on how to connect with a plurality of candidate cells. The communication can provide a configuration of the candidate cells that the scheduled entity can use to connect with one or more of the candidate cells. In some aspects, the transmitting circuitry 840 can provide the means for transmitting the communication. In some aspects, the configuration may include, for each candidate cell, PCI(s), SSB configuration, SCS, RMSI/random access configuration, rate matching patterns, DL/UL TDD configuration, SUL configuration, DL/UL cell frequency locations, DL/UL BWP configuration, PDCCH/PDSCH/PUSCH/PUCCH/SRS configuration, CSI measurement/report configuration, TAG ID, and cross-carrier scheduling configuration.

Process 900 then proceeds to block 920 where the scheduling entity 800 receives information about the plurality of candidate cells from the scheduled entity via L1/L2 signaling, wherein the L1/L2 signaling includes at least one of a first portion comprising physical layer signaling or a second portion comprising MAC layer signaling. In some aspects, the receiving circuitry 842 can provide the means for receiving the information. In some aspects, the received information may include Layer 1 (L1) measurements of the plurality of candidate cells. For example, the measurements may include L1-based metrics (e.g., L1-RSRP/SINR/RSRQ). The scheduling entity can receive the L1 measurements via L1/L2 signaling (e.g., DCI, MAC CE). In some aspects, the L1 measurements can include metrics without layer 3 averaging.

Process 900 then concludes at block 930 where the scheduling entity 800 dynamically selects via the signaling (e.g., L1/L2 signaling) at least one of the plurality of candidate cells to serve the scheduled entity. In some aspects, the selecting circuitry 844 can provide the means for dynamically selecting the plurality of candidate cells. In some aspects, the scheduling entity can select the cells based on the L1 measurements reported by the scheduled entity. In some aspects, the L1/L2 signaling may include signaling using DCI and MAC-CE.

Figure 10:
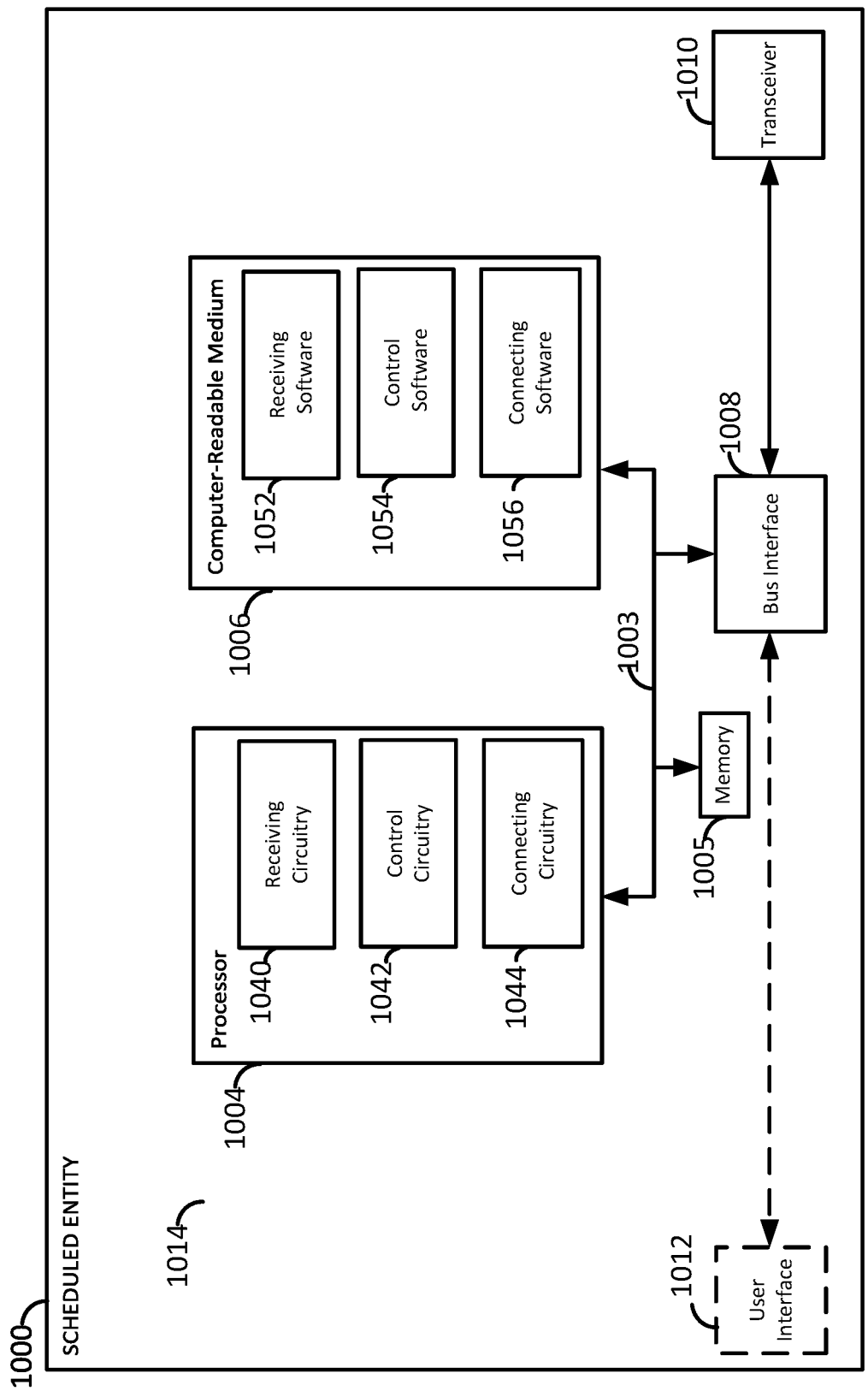
FIG. 10 is a block diagram illustrating an example of a hardware implementation for a scheduled entity employing a processing system in accordance with aspects disclosed herein.

FIG. 10 is a conceptual diagram illustrating an example of a hardware implementation for an exemplary scheduled entity 800 employing a processing system 1014. In accordance with various aspects of the disclosure, an element, or any portion of an element, or any combination of elements may be implemented with a processing system 1014 that includes one or more processors 1004. For example, the scheduled entity 1000 may be a UE as illustrated in any one or more of the FIGS. 1, 2, 5, and/or 6 disclosed herein.

The processing system 1014 may be substantially the same as the processing system 814 illustrated in FIG. 8, including a bus interface 1008, a bus 1002, memory 1005, a processor 1004, and a computer-readable medium 1006. Furthermore, the scheduled entity 1000 may include a user interface 1012 and a transceiver 1010 substantially similar to those described above in FIG. 8. That is, the processor 1004, as utilized in a scheduled entity 1000, may be used to implement any one or more of the processes described below and illustrated in the various figures.

In some aspects of the disclosure, the processor 1004 may include a receiving circuitry 1040 configured for various functions, including, for example, to receive a communication from a scheduling entity, wherein the communication facilitates a configuration of the scheduled entity 1000 on how to connect with each of a plurality of candidate cells. As illustrated, the processor 1004 may also include a control circuitry 1042 configured for various functions. For instance, the control circuitry 1042 may be configured to exchange information about the plurality of candidate cells with the scheduling entity via L1/L2 signaling, wherein the L1/L2 signaling includes at least one of a first portion comprising physical layer signaling or a second portion comprising MAC layer signaling. The processor 1004 may further include a connecting circuitry 1044 configured for various functions, including, for example, to connect the scheduled entity 1000 with at least one of the plurality of candidate cells based on the L1/L2 signaling and the configuration of the scheduled entity 1000. Furthermore, it should be appreciated that, the combination of the receiving circuitry 1040, the control circuitry 1042, and the connecting circuitry 1044 may be configured to implement one or more of the functions described herein.

Various other aspects of scheduled entity 1000 are also contemplated. In some implementations, for instance, it is contemplated that control circuitry 1042 may be configured to report measurements associated with the plurality of candidate cells to the scheduling entity (e.g., a reference signal receive power (RSRP), a signal-to-interference-plus-noise ratio (SINR), or a reference signal received quality (RSRQ)). In a particular implementation, the measurements comprise metrics measured at a given time (e.g., L1-based metrics), wherein scheduled entity 1000 may be configured to receive instructions from the scheduling entity in response to the reporting of the measurements, and wherein the scheduled entity 1000 is further configured to select or deselect a candidate cell to serve the scheduled entity 1000 based on the instructions. In another implementation, the measurements comprise metrics averaged over a period of time (e.g., L3-based metrics), wherein scheduled entity 1000 may be configured to receive instructions from the scheduling entity in response to the reporting of the measurements, and wherein the scheduled entity 1000 is further configured to remove a candidate cell from a list of candidate cells based on the instructions.

In another aspect of the disclosure, it is contemplated that scheduled entity 1000 may be configured to measure and update an uplink (UL) timing advance (TA) of a candidate cell based on the L1/L2 signaling. Within such an example, it is contemplated that scheduled entity 1000 may be configured to receive a scheduling from the scheduling entity for performing the measure and update. Alternatively, scheduled entity 1000 may be configured to perform the measure and update autonomously.

In yet another aspect of the disclosure, it is contemplated that scheduled entity 1000 may be configured to report measurements associated with at least one non-candidate cell to the scheduling entity. Within such an example, it is contemplated that scheduled entity 1000 may be further configured to add the at least one non-candidate cell to a list of candidate cells based on instructions received from the scheduling entity in response to the reporting.

Referring back to the remaining components of scheduled entity 1000, similar to processor 804, processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. Similar to computer-readable medium 806, computer-readable medium 1006 may be a non-transitory computer-readable medium comprising characteristics that are substantially similar. The computer-readable medium 1006 may reside in the processing system 1014, external to the processing system 1014, or distributed across multiple entities including the processing system 1014. It should also be appreciated that, similar to computer-readable medium 806, computer-readable medium 1006 may be embodied in a computer program product comprising characteristics that are substantially similar.

In one or more examples, the computer-readable storage medium 1006 may include receiving software 1052 configured for various functions, including, for example, to receive a communication from a scheduling entity, wherein the communication facilitates a configuration of the scheduled entity 1000 on how to connect with each of a plurality of candidate cells. As illustrated, the computer-readable medium 1006 may also include control software 1054 configured for various functions. For instance, the control software 1054 may be configured to exchange information about the plurality of candidate cells with the scheduling entity via L1/L2 signaling, wherein the L1/L2 signaling includes at least one of a first portion comprising physical layer signaling or a second portion comprising MAC layer signaling. The computer-readable medium 1006 may further include connecting software 1056 configured for various functions, including, for example, to connect the scheduled entity 1000 with at least one of the plurality of candidate cells based on the L1/L2 signaling and the configuration of the scheduled entity 1000. Furthermore, it should be appreciated that, the combination of the receiving software 1052, the control software 1054, and the connecting software 1056 may be configured to implement one or more of the functions described herein.

In a particular configuration, it is also contemplated that the scheduled entity 1000 includes means for receiving a communication from a scheduling entity, wherein the communication facilitates a configuration of the scheduled entity 1000 on how to connect with each of a plurality of candidate cells; means for exchanging information about the plurality of candidate cells with the scheduling entity via L1/L2 signaling, wherein the L1/L2 signaling includes at least one of a first portion comprising physical layer signaling or a second portion comprising MAC layer signaling; and means for connecting the scheduled entity 1000 with at least one of the plurality of candidate cells based on the L1/L2 signaling and the configuration of the scheduled entity 1000. In one aspect, the aforementioned means may be the processor(s) 1004 configured to perform the functions recited by the aforementioned means. In another aspect, the aforementioned means may be a circuit or any apparatus configured to perform the functions recited by the aforementioned means.

Figure 11:
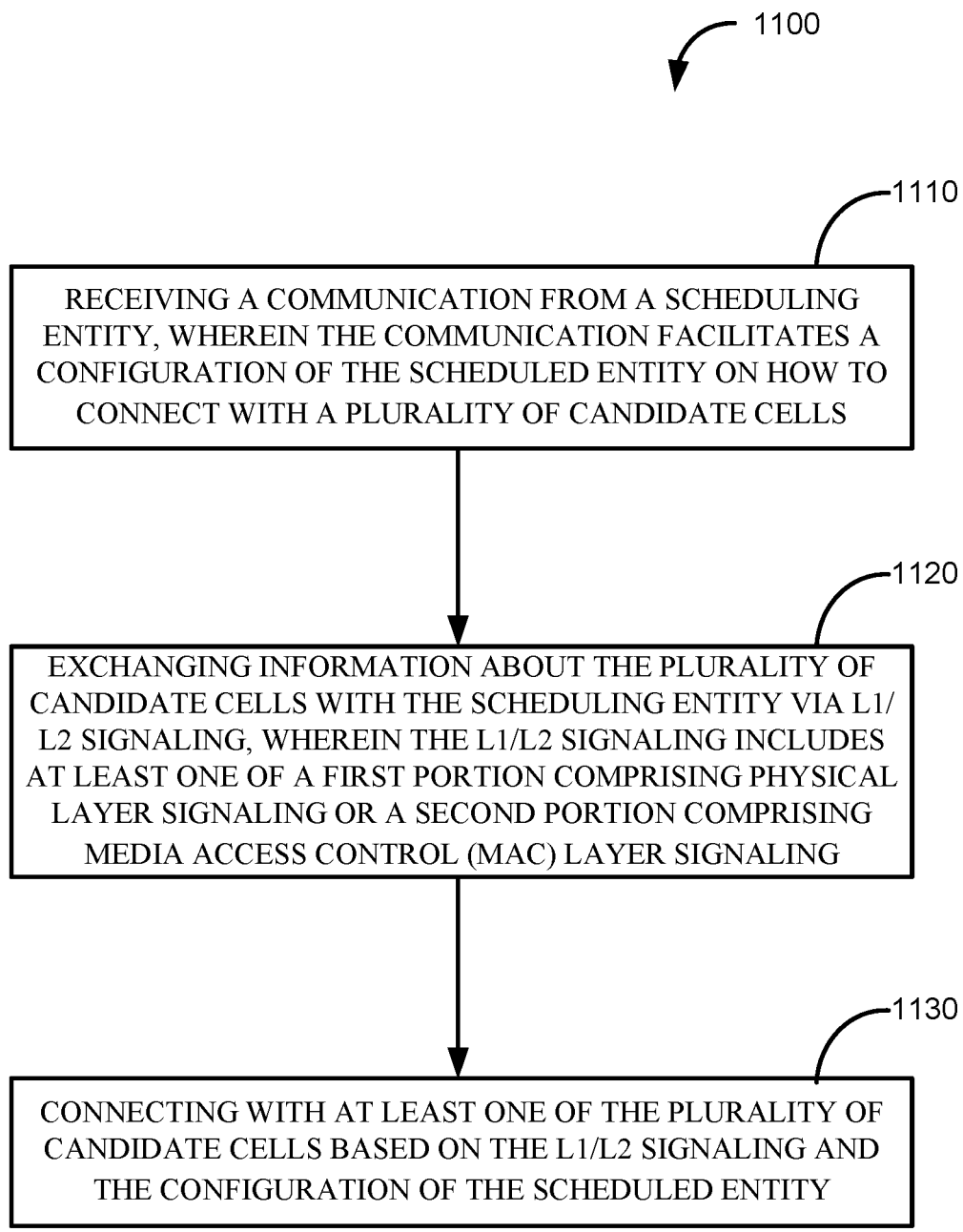
FIG. 11 is a flow chart illustrating an exemplary scheduled entity process that facilitates some aspects of the disclosure.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described herein, and utilizing, for example, the processes and/or algorithms described in relation to FIG. 11.

In FIG. 11, a flow chart is provided, which illustrates an exemplary scheduled entity process for performing some aspects of the disclosure. As described below, some or all illustrated features may be omitted in a particular implementation within the scope of the present disclosure, and some illustrated features may not be required for all implementations. In some examples, the process 1100 may be carried out by the scheduled entity 1000 illustrated in FIG. 10. In some examples, the process 1100 may be carried out by any suitable apparatus or means for carrying out the functions or algorithm described below.

Process 1100 begins at block 1110 with the scheduled entity 1000 receiving a communication from a scheduling entity (e.g., a gNB), wherein the communication facilitates a configuration of the scheduled entity 1000 on how to connect with a plurality of candidate cells. For example, the communication can provide a configuration of the plurality of candidate cells. In some aspects, the receiving circuitry 1040 can provide the means for receiving the communication. In some aspects, a configuration may include, for each candidate cell, PCI(s), SSB configuration, SCS, RMSI/random access configuration, rate matching patterns, DL/UL TDD configuration, SUL configuration, DL/UL cell frequency locations, DL/UL BWP configuration, PDCCH/PDSCH/PUSCH/PUCCH/SRS configuration, CSI measurement/report configuration, TAG ID, and cross-carrier scheduling configuration.

At block 1120, process 1100 continues with the scheduled entity 1000 exchanges information about the plurality of candidate cells with the scheduling entity via signaling (e.g., L1/L2 signaling, wherein the L1/L2 signaling includes at least one of a first portion comprising physical layer signaling or a second portion comprising MAC layer signaling.) In some aspects, the control circuitry 1042 can provide the means for exchanging information with the scheduling entity via L1/L2 signaling. In some aspects, the exchanged information includes measurements on the plurality of candidate cells. In some examples, the measurements may include Layer 1 (L1) metrics (e.g., L1-RSRP/SINR/RSRQ). The scheduled entity can transmit the measurements via L1 and/or L2 signaling (e.g., DCI, MAC CE). In some aspects, the measurements can include L1 metrics without Layer 3 averaging.

Process 1100 then concludes at block 1130 where the scheduled entity 1000 connects with at least one of the plurality of candidate cells based on the L1/L2 signaling and the configuration of the scheduled entity 1000. In some aspects, the connecting circuitry 1044 can provide the means for connecting with the plurality of candidate cells.

Several aspects of a wireless communication network have been presented with reference to an exemplary implementation. As those skilled in the art will readily appreciate, various aspects described throughout this disclosure may be extended to other telecommunication systems, network architectures and communication standards.

In a first aspect, a method of wireless communication at a scheduled entity, comprises: receiving a communication from a scheduling entity, wherein the communication comprises a configuration of a plurality of candidate cells; reporting measurements about the plurality of candidate cells to the scheduling entity via signaling comprising at least one of Layer 1 (L1) signaling or Layer 2 (L2) signaling; and connecting the scheduled entity with at least one of the plurality of candidate cells based on the signaling, and the configuration of the plurality of candidate cells.

In a second aspect, alone or in combination with the first aspect, wherein the measurements comprise L1 metrics measured without layer 3 averaging, the L1 metrics comprising at least one of a reference signal receive power (RSRP), a signal-to-interference-plus-noise ratio (SINR), or a reference signal received quality (RSRQ).

In a third aspect, alone or in combination with any of the first to second aspects, the method further comprises: receiving instructions from the scheduling entity in response to the reporting of the measurements, wherein the instructions comprise instructions for selecting or deselecting a candidate cell among the plurality of candidate cells to serve the scheduled entity.

In a fourth aspect, alone or in combination with any of the first to third aspects, the method further comprises: reporting Layer 3 (L3) measurements associated with the plurality of candidate cells, the L3 measurements derived from averaging the measurements over a period of time.

In a fifth aspect, alone or in combination with the fourth aspect, the method further comprises: receiving instructions from the scheduling entity in response to the reporting of the L3 measurements; and at least one of: removing a candidate cell from a list of candidate cells based on the instructions; or adding a candidate cell to a list of candidate cells based on the instructions.

In a sixth aspect, alone or in combination with any of the first to fourth aspects, the method further comprises: measuring and updating an uplink (UL) timing advance (TA) of one or more of the plurality of candidate cells based on the signaling.

In a seventh aspect, alone or in combination with the sixth aspect, the method further comprises: receiving, from the scheduling entity, scheduling information for measuring and updating the UL TA.

In an eighth aspect, a scheduled entity for wireless communication comprises: a communication interface configured for wireless communication with a scheduling entity; a memory; and a processor operatively coupled with the communication interface and the memory. The processor and the memory are configured to perform the methods of any of the first to seventh aspects.

In a ninth aspect, a method of wireless communication at a scheduling entity, comprises: transmitting a communication to a scheduled entity, wherein the communication comprises a configuration of a plurality of candidate cells; receiving measurements about the plurality of candidate cells from the scheduled entity via signaling comprising at least one of Layer 1 (L1) signaling or Layer 2 (L2) signaling; and dynamically selecting via the signaling at least one of the plurality of candidate cells to serve the scheduled entity based on the measurements and the configuration of the plurality of candidate cells.

In a tenth aspect, alone or in combination with the ninth aspect, wherein the measurements comprise L1 metrics measured without Layer 3 averaging, the L1 metrics comprising at least one of a reference signal receive power (RSRP), a signal-to-interference-plus-noise ratio (SINR), or a reference signal received quality (RSRQ).

In an eleventh aspect, alone or in combination with any of the ninth to tenth aspects, the method further comprises: transmitting instructions to the scheduled entity in response to receiving the measurements, wherein the instructions include instructions for selecting or deselecting a candidate cell to serve the scheduled entity.

In a twelfth aspect, alone or in combination with any of the ninth to eleventh aspects, the method further comprises: receiving Layer 3 (L3) measurements associated with the plurality of candidate cells, the L3 measurements derived from averaging the measurements over a period of time at the scheduled entity.

In a thirteenth aspect, alone or in combination with the twelfth aspect, the method, further comprises: transmitting instructions to the scheduled entity in response to receiving the L3 measurements, wherein the instructions include instructions for, at least one of: removing a candidate cell from a list of candidate cells; or adding a candidate cell to a list of candidate cells.

In a fourteenth aspect, alone or in combination with any of the ninth to twelfth aspects, the method further comprises: transmitting instructions to the scheduled entity to measure and update an uplink (UL) timing advance (TA) of one or more of the plurality of candidate cells based on the signaling.

In a fifteenth aspect, alone or in combination with any of the ninth to twelfth and fourteenth aspects, the method further comprises: transmitting scheduling information to the scheduled entity for performing the measure and update.

In a sixteenth aspect, alone or in combination with any of the ninth to twelfth, fourteenth, and fifteenth aspects, the method further comprises: transmitting instructions to the scheduled entity to perform the measure and update autonomously.

In a seventeenth aspect, a scheduling entity for wireless communication comprises: a communication interface configured for wireless communication with a scheduled entity; a memory; and a processor operatively coupled with the communication interface and the memory, wherein the processor and the memory are configured to perform the method of any of the ninth to sixteenth aspects.

By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A scheduled entity comprising:
   transceiver;
   memory comprising first instructions; and
   one or more processors configured to execute the first instructions and cause the scheduled entity to:
      receive, via the transceiver, a communication, wherein the communication comprises a configuration of a plurality of candidate cells that are configured for inter-cell mobility effected by at least one of Layer 1 (L1) signaling or Layer 2 (L2) signaling;
      report, via the transceiver and via at least one of the L1 signaling or the L2 signaling, first measurements about the plurality of candidate cells, the first measurements comprising L1 metrics measured independent of Layer 3 averaging;
      receive, via the transceiver, second instructions subsequent to the reporting of the first measurements, the second instructions comprising instructions for selecting or deselecting a candidate cell among the plurality of candidate cells;
      select the candidate cell among the plurality of candidate cells based on the second instructions; and
      connect, via the transceiver, with the selected candidate cell by using at least one of the L1 signaling or the L2 signaling.

2. The scheduled entity of claim 1, wherein the L1 metrics comprise at least one of a reference signal receive power (RSRP), a signal-to-interference-plus-noise ratio (SINR), or a reference signal received quality (RSRQ).

3. The scheduled entity of claim 1, wherein the one or more processors are further configured to cause the scheduled entity to:
   derive Layer 3 (L3) measurements associated with the plurality of candidate cells by averaging the first measurements over a period of time;
   report the L3 measurements; and
   receive, via the transceiver, third instructions subsequent to the reporting of the L3 measurements, the third instructions comprising at least one of:
      instructions to remove a candidate cell from the plurality of candidate cells; or
      instructions to add a candidate cell to the plurality of candidate cells.

4. The scheduled entity of claim 1, wherein the one or more processors are further configured to cause the scheduled entity to:
   receive, via the transceiver, a downlink control information (DCI) or a medium access control (MAC) control element, including the instructions for selecting or deselecting the candidate cell among the plurality of candidate cells.

5. The scheduled entity of claim 1, wherein the one or more processors are further configured to cause the scheduled entity to:
   receive, via the transceiver, scheduling information;
   measure a propagation delay of the one or more of the plurality of candidate cells, the measurement being based on the scheduling information; and
   update an uplink timing advance based on the propagation delay.

6. The scheduled entity of claim 5, wherein the one or more processors are further configured to cause the scheduled entity to:
   receive, via the transceiver, a physical downlink control channel (PDCCH) order, wherein the PDCCH order is configured to cause the scheduled entity to measure the UL TA.

7. The scheduled entity of claim 1, wherein at least one of the L1 signaling or the L2 signaling is configured to effect the inter-cell mobility independent of signaling in a layer above the L2.

8. The scheduled entity of claim 1, wherein the configuration of each of the plurality of candidate cells comprises at least one of a physical layer cell identifier (PCI), a synchronization signal block (SSB) configuration, or a measurement configuration.

9. The scheduled entity of claim 1, wherein the one or more processors are configured to:
   receive, via the transceiver, a pre-configured cell configuration prior to reporting the first measurements; and
   connect, via the transceiver, the scheduled entity with the selected candidate cell using the pre-configured cell configuration.

10. The scheduled entity of claim 1, wherein the one or more processors are further configured to:
    perform Layer 3 (L3) measurements on a non-candidate cell not included in the plurality of candidate cells;
    report, via the transceiver, the L3 measurements; and
    add the non-candidate cell to the plurality of candidate cells based on instructions received subsequent to reporting the L3 measurements.

11. A method of wireless communication at a scheduled entity, comprising:
    receiving a communication, wherein the communication comprises a configuration of a plurality of candidate cells that are configured for inter-cell mobility effected by at least one of Layer 1 (L1) signaling or Layer 2 (L2) signaling;
    reporting, via at least one of the L1 signaling or the L2 signaling, first measurements about the plurality of candidate cells, the first measurements comprising L1 metrics measured independent of Layer 3 averaging;
    receiving first instructions subsequent to the reporting of the first measurements, the first instructions comprising instructions for selecting or deselecting a candidate cell among the plurality of candidate cells;

selecting the candidate cell among the plurality of candidate cells based on the first instructions; and
connecting with the selected candidate cell by using at least one of the L1 signaling or the L2 signaling.

12. The method of claim 11, further comprising:
deriving Layer 3 (L3) measurements associated with the plurality of candidate cells by averaging the first measurements over a period of time;
reporting the L3 measurements; and
receiving second instructions subsequent to reporting the L3 measurements, the second instructions comprising at least one of:
instructions to remove a candidate cell from the plurality of candidate cells; or
instructions to add a candidate cell to the plurality of candidate cells.

13. A scheduling entity comprising:
a transceiver;
memory comprising first instructions; and
one or more processors configured to execute the first instructions and cause the scheduling entity to:
transmit, via the transceiver, a communication, wherein the communication comprises a configuration of a plurality of candidate cells that are configured for inter-cell mobility effected by at least one of Layer 1 (L1) signaling or Layer 2 (L2) signaling;
receive, via the transceiver and via at least one of the L1 signaling or the L2 signaling, first measurements about the plurality of candidate cells from a scheduled entity via at least one of the L1 signaling or the L2 signaling, the first measurements comprising L1 metrics measured independent of Layer 3 averaging; and
transmit, via the transceiver and to the scheduled entity, second instructions subsequent to receiving the first measurements, the second instructions comprising instructions for selecting or deselecting a candidate cell among the plurality of candidate cells.

14. The scheduling entity of claim 13, wherein the L1 metrics comprise at least one of a reference signal receive power (RSRP), a signal-to-interference-plus-noise ratio (SINR), or a reference signal received quality (RSRQ).

15. The scheduling entity of claim 13, wherein the configuration of each of the plurality of candidate cells comprises at least one of a physical layer cell identifier (PCI), a synchronization signal block (SSB) configuration, or a measurement configuration.

16. The scheduling entity of claim 13, wherein the one or more processors are further configured to cause the scheduling entity to:
receive, via the transceiver, Layer 3 (L3) measurements associated with the plurality of candidate cells, the L3 measurements derived from averaging the first measurements over a period of time; and
transmit, via the transceiver, third instructions to the scheduled entity subsequent to receiving the L3 measurements,
wherein the third instructions comprise at least one of:
instructions to remove a candidate cell from the plurality of candidate cells; or
instructions to add a candidate cell to the plurality of candidate cells.

17. The scheduling entity of claim 13, wherein the one or more processors are further configured to cause the scheduling entity to:
transmit, via the transceiver, a downlink control information (DCI) or a medium access control (MAC) control element, including the instructions for selecting or deselecting the candidate cell among the plurality of candidate cells.

18. The scheduling entity of claim 13, wherein the one or more processors are further configured to cause the scheduling entity to:
transmit, via the transceiver, third instructions to the scheduled entity to measure and update an uplink (UL) timing advance (TA) of one or more of the plurality of candidate cells based on at least one of the L1 signaling or the L2 signaling.

19. The scheduling entity of claim 18, wherein the third instructions comprise scheduling information that schedules the scheduled entity to measure and update the UL TA of the one or more plurality of candidate cells.

20. The scheduling entity of claim 13, wherein at least one of the L1 signaling or the L2 signaling is configured to effect the inter-cell mobility independent of signaling in a layer above the L2.

* * * * *